United States Patent
Mukaida et al.

(10) Patent No.: US 8,078,661 B2
(45) Date of Patent: Dec. 13, 2011

(54) MULTIPLE-WORD MULTIPLICATION-ACCUMULATION CIRCUIT AND MONTGOMERY MODULAR MULTIPLICATION-ACCUMULATION CIRCUIT

(75) Inventors: Kenji Mukaida, Kawasaki (JP);
Masahiko Takenaka, Kawasaki (JP);
Naoya Torii, Kawasaki (JP); Shoichi Masui, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1285 days.

(21) Appl. No.: 10/898,178

(22) Filed: Jul. 26, 2004

(65) Prior Publication Data
US 2005/0165876 A1    Jul. 28, 2005

(30) Foreign Application Priority Data
Jan. 26, 2004  (JP) ................. 2004-017205

(51) Int. Cl.
*G06F 7/38*       (2006.01)
(52) U.S. Cl. ......................... 708/523; 708/490
(58) Field of Classification Search ............ 708/523
See application file for complete search history.

(56) References Cited

U.S. PATENT DOCUMENTS

| | | | | |
|---|---|---|---|---|
| 5,522,085 | A * | 5/1996 | Harrison et al. ............ | 712/32 |
| 5,583,804 | A * | 12/1996 | Seal et al. .................. | 708/523 |
| 5,787,025 | A * | 7/1998 | Muwafi et al. ............. | 708/490 |
| 5,847,981 | A * | 12/1998 | Kelley et al. .............. | 708/603 |
| 5,941,940 | A * | 8/1999 | Prasad et al. .............. | 708/523 |
| 6,484,194 | B1 | 11/2002 | Henderson et al. | |
| 6,557,022 | B1 * | 4/2003 | Sih et al. ................... | 708/523 |
| 6,564,238 | B1 * | 5/2003 | Kim et al. .................. | 708/513 |
| 6,957,242 | B1 * | 10/2005 | Snyder ....................... | 708/490 |

FOREIGN PATENT DOCUMENTS

| | | |
|---|---|---|
| EP | 1 217 512 A2 | 11/2001 |
| JP | 2002-207589 | 7/2002 |

OTHER PUBLICATIONS

Montgomery, "Modular Multiplication Without Trial Division", Mathematics of Computation, vol. 44, No. 170, pp. 519-520 (1985).
Koç, "High-Speed RSA Implementation", Technical Report TR 201, RSA Laboratories, Version 2.0, pp. 48-59 (1994).
Cetin Kaya Koc, et al.; "Analyzing and Comparing Montgomery Multiplication Algorithms"; IEEE Micro.; Jun. 1996; vol. 16, No. 3, pp. 26-33.
Cetin Kaya Koc; "High-Speed RSA Implementation"; RSA Laboratories; 1994; pp. 1-70.
Alexandre F. Tenca, et al.; "A Scalable Architecture for Montgomery Multiplication"; Cryptographic Hardware and Embedded Systems Int'l Workshop; Aug. 12, 1999; pp. 94-108.

* cited by examiner

*Primary Examiner* — Lewis Bullock, Jr.
*Assistant Examiner* — Michael Yaary
(74) *Attorney, Agent, or Firm* — Fujitsu Patent Center

(57) ABSTRACT

A multiple-word multiplication-accumulation circuit suitable for use with a single-port memory. The circuit is composed of a multiplication-accumulation (MAC) operator and surrounding registers. The MAC operator has multiplicand and multiplier input ports with different bit widths to calculate a sum of products of multiple-word data read out of a memory. The registers serve as buffer storage of multiple-word data to be supplied to individual input ports of the MAC operator. The amount of data supplied to the MAC operator in each clock cycle is adjusted such that total amount of data consumed and produced by the MAC operator in one clock cycle will be equal to or smaller than the maximum amount of data that the memory can transfer in one clock cycle. This feature enables the use of a bandwidth-limited single-port memory, without causing adverse effect on the efficiency of MAC operator usage.

8 Claims, 11 Drawing Sheets

MULTIPLE-WORD MULTIPLICATION-ACCUMULATION CIRCUIT AND MONTGOMERY MODULAR MULTIPLICATION-ACCUMULATION CIRCUIT

CROSS-REFERENCE TO RELATED APPLICATIONS

This application is based on, and claims priority to, Japanese Application No. 2004-017205, filed Jan. 26, 2004, in Japan, and which is incorporated herein by reference.

BACKGROUND OF THE INVENTION

1. Field of the Invention

The present invention relates to a multiple-word multiplication-accumulation (MAC) circuit and a Montgomery modular MAC circuit. More particularly, the present invention relates to a multiple-word MAC circuit suitable for execution of modular multiplication and accumulation for the Montgomery algorithm, as well as to a Montgomery modular MAC circuit based on the same.

2. Description of the Related Art

Recent years have seen a rapid growth of online trade market, also known as electronic commerce (e-commerce), where commercial transactions involving money transfers take place over a network. People are exchanging personal information such as their credit card numbers over a network more frequently than ever before. Such important personal information has to be protected from eavesdropping and tampering attacks by a malicious third party. The use of cryptographic techniques is thus mandatory to ensure the security of information transfer in e-commerce.

Public-key cryptosystems, one of the modern cryptographic algorithms, use a pair of cryptographic keys called public and private keys. The sender encrypts his/her message with the receiver's public key, and the receiver decrypts the received message with his/her own secret private key. Suppose, for example, that a person is purchasing a product at an online store. The online store's server sends their public key to the purchaser, allowing him/her to send his/her credit card number and other information in encrypted form. The store can decode the received information by using their private key. The advantage of this system is that the public key is made available literally to the public. That is, public-key cryptosystems permit us to achieve secure communication with anyone who have publicized their encryption keys.

One example of a public-key algorithm is RSA, named after its three creators: Ron Rivest, Adi Shamir, and Leonard Adleman. The RSA cryptosystem uses a modular multiplication process to ensure the secrecy of ciphertext, relying on the difficulty of prime factorization of a large integer. That is, when a certain number x and an integer n are given, it is relatively easy for a computer to calculate a power of x modulo n, where "modulo" is the operator to calculate the remainder of division by n. But, because of the difficulty of prime factorization, it is very hard to accomplish the reverse process when n is very large, meaning that the original number x cannot be reproduced easily. RSA is grounded on this nature of modular arithmetic.

RSA, however, requires a larger amount of computation for modular multiplication than symmetric cryptosystems such as the Data Encryption Standard (DES), and this fact leads to demands for a faster algorithm. Montgomery modular multiplication method is one of the solutions for reducing computational burden. When a radix R coprime to an integer N is selected such that R>N, the Montgomery algorithm computes $T \times R^{-1}$ mod N (i.e., remainder of division of $T \times R^{-1}$ by integer N) from an input value T satisfying $0 \leq T \leq R \times N$, where modulus N is represented as an irreducible polynomial of degree N. $R^{-1}$ denotes the multiplicative inverse element of radix R, modulo N; i.e., R and $R^{-1}$ satisfy $R \times R^{-1} = 1$. The algorithm achieves "modulo N" computation by repeating addition, multiplication, and shift operation, without the need for time-consuming division, which requires repetitive subtractions. This is a great advantage particularly when the integer N is very large. For details, see: P. L. Montgomery, "Modular Multiplication without Trial Division," Mathematics of Computation, Vol. 44, No. 170, pp. 519-521, 1985.

More specifically, with input values A, B, C, R, N, and ND, the algorithm proceeds in the following way:

$$T = A \times B + C \tag{1}$$

$$M = T \times ND \bmod R \tag{2}$$

$$X = (M \times N + T)/R \tag{3}$$

$$Y = X - N \tag{4}$$

where ND satisfies the condition of $R \times R^{-1} - N \times ND = 1$, and T and M are variables representing intermediate variables. X and Y are output values, where X will be selected as the final outcome of the computation when Y>0, and Y will be selected when $Y \leq 0$. Each input value A, B, C, and N is given in the form of multiple-word data with a length of, for example, 2048 bits and stored as a series of data words in a certain memory area. Radix R is a power of 2 (e.g., $2^{2048}$), and the memory stores its exponent only (2048 in this case), instead of the value of R per se. Essentially, the input value ND is multiple-word data like other input values. However, only a limited number of bits of ND are required in actual computation, depending on the bit width of the multiplier used. The reason for this will be discussed later.

The first equation (1) is a sum-of-product operation, which is usually implemented as iterations of (d,e)=a×b+c+d by using a multiplier-accumulator (MAC operator) with a fixed operation data width (e.g., 32 bits), where d and e represent upper bits and lower bits of the result obtained at each iteration, and where d is fed back to the input side for use in the subsequent iteration. More specifically, the following shows the algorithm for executing the first equation (1):

```
(1.1)    for (i=0 to s-1){
(1.2)        a:=A[i]
(1.3)        d:=0
(1.4)        for(j=0 to s-1){
(1.5)            b:=B[j]
(1.6)            if (i==0) c=C[j]
(1.7)            else c=T[i+j]
(1.8)            (d,e):=a×b+c+d
(1.9)            T[i+j]:=e
(1.10)       }
(1.11)       T[i+s]:=d
(1.12)   }
```

This process includes a double loop structure with loop variables i and j, in which an inner loop of lines 1.4 to 1.10 is nested within an outer loop of lines 1.1 to 1.12, so that the iterative calculation will proceed from lower bits to upper bits. The symbol s in lines 1.1, 1.4, and 1.11 represents a constant that is obtained by dividing data length by word length. The brackets [ ] are used to point at a particular data word of a variable, counted from its least significant word. For example, A[0] represents the bottom 32 bits of variable A in the case the word length is 32 bits.

FIG. 11 is a block diagram of a conventional multiple-word MAC circuit. This multiple-word MAC circuit 900 is composed of a memory 901, a MAC operator 902, and registers 903, 904, 905, 906, and 907. The memory 901 stores given multiple-word input values A, B, and C for computation. Those input values A, B, and C are read out of the memory 901 and supplied to the MAC operator 902 word by word through registers 903 and 904, and 905. The MAC operator 902 calculates A×B+C, the result T being written back to the memory 901 via a register 907.

The conventional multiple-word MAC circuit 900 of FIG. 11 executes the foregoing algorithm as follows. Suppose that there is a control circuit (not shown) that produces loop variables i and j and supplies them to the memory 901 as its address input. Input values A[i], B[j], and C[j] are arrays of words, each word being W bits in width. The multiple-word MAC circuit 900 reads a word of each input value A[i], B[j], and C[j] out of the memory 901, where T[i+j] may be read instead of C[j]. Those A[i], B[j], and C[j] are set to the registers 903, 904, and 905 as new data to the MAC operator inputs a, b, and c, respectively. The MAC operator 902 calculates (d,e):=a×b+c+d (i.e., executes line 1.8) and sends the results d and e to their corresponding registers 906 and 907. The former register 906 allows d to be fed back to the MAC operator 902 as an input for the next cycle, while the latter register 907 supplies e to the memory 901 to substitute for T[i+j].

The conventional multiple-word MAC circuit 900 executes the foregoing algorithm in the way described above. This process involves reading of input values b and c from the memory 901 and writing of an output value e to the same in each iteration of the inner loop, after reading the multiplicand a at the beginning (line 1.2) of the outer loop. In order to run the MAC operator 902 at the full clock speed without stopping the pipeline, the memory 901 is required to have the ability of transferring three words per clock cycle. The use of a multiport memory device or a plurality of separate memory devices is recommended as a solution for giving sufficient bandwidth to the memory 901. See, for example, the Japanese Patent Application Publication No. 2002-207589, FIG. 1.

Referring back to the algorithm of (1) to (5), the third equation (3) is executed basically in the same way as (1). The division by R can be accomplished by simply shifting the dividend to the right since the divisor R is a power of 2. The first three equations (1), (2), and (3) may be processed one by one, but this approach is not necessarily efficient since the multiple-word value ND has to be calculated in its full length. One improved processing technique in this respect is described in Ç. K. Koç, "High-Speed RSA Implementation," Technical Report TR 201, RSA Laboratories, Version 2.0, November, pp. 48-49, 1994. According to the algorithm proposed in this paper, the first equation (1) calculates an intermediate variable T step by step, from the bottom bits to the top bits. Each time a new value of T comes out, the process executes equation (2) with respect to the bottom word of that value of T, thus determining the bottom word of another intermediate variable M. With those partial values of T and M, the process proceeds to equation (3) to calculate a corresponding part of output value X. While ND in equation (1) is essentially a multiple-word value, the improved algorithm requires not all words together, but only one word at a time.

SUMMARY OF THE INVENTION

The present invention provides a multiple-word multiplication-accumulation (MAC) circuit that performs MAC operation on given input values each supplied as multiple-word data. The circuit comprises the following elements: (a) a memory providing storage for a plurality of multiple-word data; (b) a MAC operator having multiplicand and multiplier input ports with different bit widths to calculate a sum of products of the multiple-word data read out of the memory; and (c) a plurality of registers to supply the multiple-word data to the MAC operator, wherein the amount of the data to be supplied in each clock cycle is adjusted such that total amount of data consumed and produced by said MAC operator in one clock cycle will be equal to or smaller than maximum amount of data that the memory can transfer in one clock cycle.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

In the section of "Description of the Related Art," we have discussed why a multiple-word MAC circuit needs a memory with high data transfer capability. Using a multiport memory for this purpose, however, leads to increased chip size. Also, assigning separate memories for individual variables makes layout design more difficult. Single-port memory, on the other hand, takes up less chip space, but its ability of transferring data is limited to one word per clock cycle, which is too slow for a MAC operator to produce an output on every clock cycle. This means that the MAC operator is unable to deliver the expected performance, due to the lack of sufficient memory bandwidth. Recall, for example, the multiple-word MAC circuit 900 designed for execution of equation (1). This conventional circuit consumes at least three clock cycles to produce a single MAC result because it is only allowed to start after receiving three single-word input values A, B, and C sequentially.

In view of the foregoing, it is an object of the present invention to provide a more efficient multiple-word multiplication-accumulation circuit that is suitable for use with a single-port memory.

It is another object of the present invention to provide a more efficient Montgomery modular multiplication-accumulation circuit that is suitable for use with a single-port memory.

Multiple-Word MAC Circuit

Preferred embodiments of the present invention will now be described in detail below with reference to the accompanying drawings, assuming that radix R is a power of 2 and that N is an odd integer.

Figure 1:
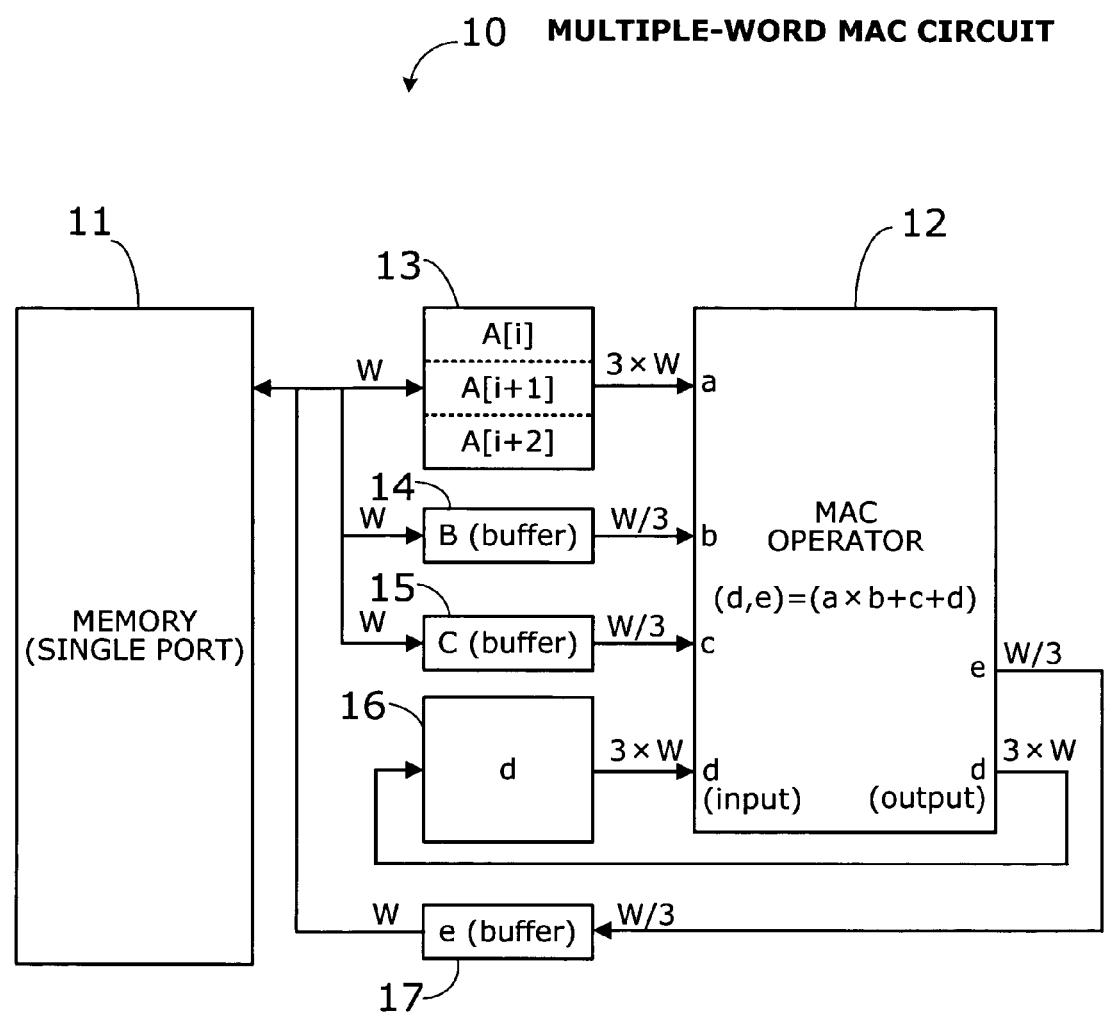
FIG. 1 is a conceptual view of a multiple-word MAC circuit according to an embodiment of the present invention.

FIG. 1 is a conceptual view of a multiple-word multiplication-accumulation (MAC) circuit according to an embodiment of the present invention. To calculate A×B+C from given multiple-word input data A, B, and C, the illustrated multiple-word MAC circuit 10 comprises a memory 11, a MAC operator 12, and registers 13, 14, 15, 16, and 17. The memory 11 is a single-port memory to store input values A, B, and C, as well as to receive computation results, each of which is multiple-word data with a length of, for example, 2048 bits. The data width of the memory 11 is referred to by the symbol "W" denoting "word." That is, the memory 11 offers a data transfer speed of one word (1W) per clock cycle.

Supplied with three input values A, B, and C, the MAC operator 12 performs multiplication of multiplicand A and multiplier B and then adds C to the resulting product, where the multiplicand and multiplier are dissimilar in data width. More specifically, the multiplicand A is three words (3×W) in width, while the multiplier B is one-third the word width (W/3). The MAC operator 12 computes A×B+C from such input values and outputs the result.

The topmost register 13 in FIG. 1 stores a three-word (3×W) portion of A, which is an input value consisting of multiple words. The values in brackets serve as an index that indicates a particular part of an input value. Specifically, the index i in A[i] varies within a range of 0≦i≦s−1, where s denotes the number of data words constituting the input value A (i.e., s equals the data length of A divided by the word length W). A[i] thus refers to the ith word, counting from zero, A[0] being the least significant word. The register 13 stores A[i], A[i+1], and A[i+2], which are the ith to (i+2)th words of A. Those three words are entered to the MAC operator 12 as an input "a."

The next two registers 14 and 15 are used to store input values B and C, one word in each. Each of those registers 14 and 15 functions as a read buffer that stores given data for a certain period while outputting a fraction of the stored data each time it is requested. That is, they provide the MAC operator 12 with input values "b" and "c" by sending each one-third (W/3) of their stored data in synchronization with a clock signal (not shown). Such buffering functions can easily be implemented by designing them as shift registers.

The second-to-bottom register 16 stores the upper three-word (3×W) portion of the MAC operator's output, which is referred to as output "d," for use by the MAC operator 12 itself as an input in the next operation cycle. The MAC operator 12 calculates (d,e)=a×b+c+d, accordingly.

The bottommost register 17 stores the lowest one-third word (W/3) portion of the MAC operator's output, which is referred to as the "e" output. This register 17 functions as a write buffer that receives output data from the MAC operator 12, one-third word (W/3) at a time, and writes the accumulated data to the memory 11 when its size reaches one word (W).

The registers 13 to 17 are arranged as such. Note that the amount of data to be supplied to the MAC operator 12 at each clock tick is optimized by the non-uniform bit widths of the MAC operator's input ports, so that the total amount of data supplied to and produced by the MAC operator 12 will balance with the data transfer rate that the memory 11 can offer. In the example of FIG. 1, the MAC operator 12 consumes one-third (W/3) of register values of B and C in a clock cycle, and produces a result value with a length of one-third word (W/3) in that cycle. Note that the top three words (3×W) of the MAC output are not taken into account since they are fed to the register 16 for use in the next clock cycle. Thus the total amount of data consumed and produced in each single clock cycle is equivalent to one word (W) in the present case, which is equal to the maximum data transfer capability (W per clock cycle) that we assume for the memory 11. This bandwidth calculation justifies the use of a single-port memory.

Unlike conventional MAC operators with equal input bit widths, the MAC operator 12 of the present invention has input ports for multiplicand and multiplier with different bit widths to calculate a sum of products. This asymmetric design of the proposed MAC operator 12 permits performance enhancement through the use of appropriate acceleration techniques, such as distributed carry processing (described later) and pipelined data processing (also described later). Further, the proposed MAC operator 12 is comparable to conventional ones in terms of the number of gates required for their implementation.

The multiple-word MAC circuit 10 of FIG. 1 operates as follows. According to the present embodiment of the invention, the multiple-word MAC circuit 10 executes an algorithm with double-loop structure which is similar to that of conventional circuits, except for the selection of data widths of registers. That is, it performs MAC operations by repeating outer and inner loops. The outer loop supplies the MAC operator 12 with an input value A, three words (3×W) at a time, from lower bits to upper bits, while the inner loop gives other input values B and C, one-third word (W/3) at a time.

When it is started, the multiple-word MAC circuit 10 makes access to the memory 11 three times to read out a specified portion (A[i], A[i+1], A[i+2]) of multiple-word input data A, which is, at the first occurrence, the bottom three words of A. This three-word value read out of the memory 11 is set to the register 13 for use by the MAC operator 12 as its "a" input. Then another two read cycles from the memory 11 follow to set one-word long portions of other input data B and C to their corresponding registers 14 and 15. These values of B and C are supplied, not wholly, but only W/3 at a time, to the MAC operator 12 for use as its "b" and "c" inputs.

The MAC operator 12 calculates (d,e)=a×b+c+d in one clock cycle, producing three and one-third words (3×W+W/3) of output data. The "d" output, or the upper three-word part of the MAC output, is sent to the register 16. This register value "d" will be used as an input in the subsequent clock cycle, in which the registers 14 and 15 are to supply the next one third (W/3) of "b" and "c" inputs. On the other hand, the "e" output, or the lowest one-third word (W/3) of the MAC output, is sent to the register 17 for buffering. The content of this register 17 will not be transferred to the memory 11 until it is filled with three instances of "e" outputs.

The inner loop process finishes its first iteration in the manner described above, consuming single-word data in the registers 14 and 15. The second iteration then begins with loading the next significant words of multiple-word input values B and C from the memory 11 to their corresponding registers 14 and 15, thus permitting the MAC operator 12 to calculate (d,e)=a×b+c+d in the same way as described above.

It is not possible to read out new values of B and C at the same time because the memory 11 used in the multiple-word MAC circuit 10 is a single-port memory. To synchronize those two inputs B and C supplied from the registers 14 and 15 to the multiple-word MAC circuit 10, the former register 14, for example, has more bits than the other register 15. Then a memory read cycle to load the register 14 with B occurs first, and the register shifts the data through its extended bits, during which the other register 15 can receive C from the memory 11. The two register values thus arrive simultaneously at their respective input ports of the MAC operator 12, W/3 at a time, thus enabling the MAC operator 12 to continue running without interruption. This will be described in detail later.

Upon completion of MAC operations for all words of input data B and C, the multiple-word MAC circuit 10 proceeds to the next iteration of the outer loop process by reading out the next significant three words of input data A. The multiple-word MAC circuit 10 executes more iterations while loading new sets of A[i], A[i+1], and A[i+2], until the entire set of data words of A are subjected to the calculation.

With the above-described circuit structure of the present invention, the MAC operator 12 can operate with a bandwidth-limited single-port memory without sacrificing efficiency in its use. That is, the proposed circuit can produce its output at every clock cycle, thus making it possible to provide an efficient multiple-word multiplier-accumulator.

Montgomery Modular Multiplication-Accumulation

We will now describe Montgomery modular multiplication-accumulation as an application of the multiple-word MAC circuit 10 of FIG. 1. Our proposed process executes Montgomery modular multiplication-accumulation with given input data of A, B, C, and N and outputs the results X and Y to a single-port memory, together with the sign of Y. For illustrative purposes, we assume that input data A, B, C, and N are 256 bits in length, that radix R is $2^{256}$, and that another input data ND is 64 bits in length. The process also uses variables T and M to represent intermediate results. Given 256-bit input values A and B are each divided into 16-bit segments, which are expressed as follows:

$$A(255{:}0)=\{a15, a14, a13, a12, \ldots a3, a2, a1, a0\};$$

$$B(255{:}0)=\{b15, b14, b13, b12, \ldots b3, b2, b1, b0\};$$

where a15 and b15 are the topmost segments and a0 and b0 are the bottommost segments. This notation applies also to the other values and variables C, N, T, M, X, and Y.

With the input values and variables defined above, the algorithm of Montgomery modular multiplication-accumulation goes as follows:

$$T = A \times B + C \quad (5)$$

$$M = \{t3, t2, t1, t0\} \times ND \bmod 2^{64} \quad (6)$$

$$X = (M \times N + T)/2^{64} \quad (7)$$

$$Y = X - N \quad (8)$$

where X will be selected as the final result of the computation when Y>0, and Y will be selected when Y≦0. Note here that the divisor in equations (6) and (7) is not $R=2^{256}$ per se, but $2^{64}$. This is because the algorithm uses a technique we mentioned earlier with reference to Ç. K. Koç, "High-Speed RSA Implementation." More specifically, the intermediate variable T is determined in a stepwise manner, from lower end to upper end, in the process of calculating equation (5). Each time a new part of T becomes available, the algorithm determines the bottom words of another intermediate variable M by calculating equation (6) with reference to the bottom words of T. An output value X is then obtained by applying those values of T and M to equation (7).

Figure 2:
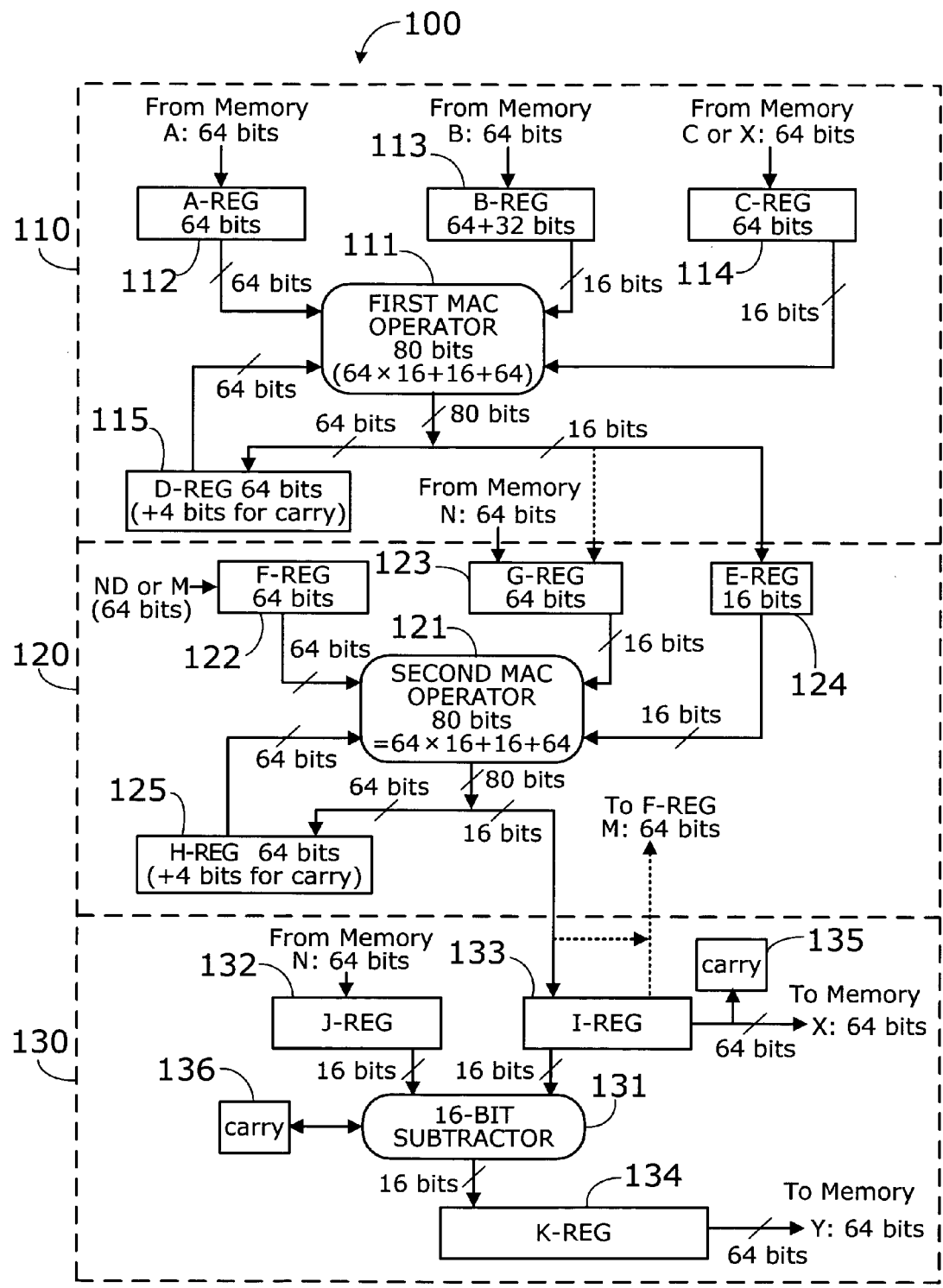
FIG. 2 shows the structure of a Montgomery modular MAC circuit according to a more specific embodiment of the present invention.

FIG. 2 shows the structure of a Montgomery modular multiplication-accumulation (MAC) circuit 100 according to an embodiment of the present invention. To implement the Montgomery modular multiplication-accumulation algorithm of equations (5) to (8), the illustrated circuit 100 employs two MAC modules 110 and 120 connected in series, each of which has functions of the multiple-word MAC circuit 10 described in FIG. 1. Those MAC modules 110 and 120 are coupled to a memory (not shown in FIG. 2). The Montgomery modular MAC circuit 100 of the present embodiment further comprises a subtraction unit 130 to calculate equation (8).

While FIG. 2 does not show it, the Montgomery modular MAC circuit 100 includes a 64-bit wide single-port memory, which only allows either read or write access to a single address in one clock cycle. This memory stores input values A, B, C, and N for computation, as well as receiving output values X and Y to be obtained as a result of computation. It also serves as temporary storage for intermediate variables T and M. Also not shown in FIG. 2 are registers dedicated to store other input values R and ND, disposed separately from the memory because of their small data widths.

The first MAC module 110 is in charge of equation (5), and to this end, it employs a MAC operator 111 (called "first MAC operator" to distinguish from the counterpart in the second MAC module 120) and its surrounding data registers including: A-register (A-REG) 112, B-register (B-REG) 113, C-register (C-REG) 114, and D-register (D-REG) 115. Given input values A, B, and C, the first MAC operator 111 calculates A×B+C, where the multiplicand A and multiplier B have different bit widths. Specifically, the first MAC operator 111 performs multiplication of 64 bits by 16 bits for the product term A×B.

The A-register 112 stores a 64-bit portion of a given multiple-word input value A read out of the memory. The B-register 113 stores a 64-bit portion of a given multiple-word input value B read out of the memory, which is transferred, 16 bits at a time, with the lowest word first, to the first MAC operator 111 in synchronization with a clock signal (not shown). In addition, the B-register 113 has an extra buffer with a capacity of 32 bits, hence "64+32 bits." Although the memory does not allow two input values B and C to be read out together in a single clock cycle, it is possible to supply B and C to the first MAC operator 111 at the same time, by reading B two clocks earlier than C.

In the first iteration of the outer loop, the C-register 114 stores a 64-bit portion of a given multiple-word input value C read out of the memory. In the second and subsequent iterations of the outer loop, it is used to store the output value X. The C-register 114 shifts itself to the right by 16 bits at a time, thereby transferring the data to the first MAC operator 111 in synchronization with a clock signal (not shown), with the lowest word first.

The D-register 115 stores the upper 64 bits of 80-bit intermediate variable T that the first MAC operator 111 produces. This D-register 115 is actually provided as a 68-bit wide register to store four carry bits that are produced by and sent back to the first MAC operator 111 as will be described later.

With the above-described configuration of registers, the first MAC operator 111 takes in input values B and C each at the rate of 16 bits per clock cycle. While the MAC output has a width of 80 bits, the upper 64 bits are for use as a MAC input in the next clock cycle, meaning that the net amount of output data is only 16 bits. The total amount of data consumed and produced in each single clock cycle is 48 bits in this case, which is below the maximum data transfer capability (64 bits per clock cycle) that we assume for a single-port memory.

The second MAC module 120 is composed of a MAC operator 121 (second MAC operator) and its surrounding data registers including: F-register (F-REG) 122, G-register (G-REG) 123, E-register (E-REG) 124, and H-register (H-REG) 125. The second MAC operator 121 takes charge of equations (6) and (7). In calculating $\{t3, t2, t1, t0\} \times ND$, the second MAC operator 121 concentrates on lower 64 bits to achieve modulo $2^{64}$ operation. It then applies the result of equation (6) to the subsequent processing of equation (7), thus yielding M×N+T.

The F-register 122 stores an input value ND received from another register (not shown) when calculating equation (6). When calculating equation (7), it stores an intermediate variable M received from I-register 133 (described later).

The G-register 123 stores a 64-bit portion of a given multiple-word input value N read out of the memory. This G-register 123 shifts itself to the right by 16 bits at each clock cycle, thereby supplying the value of N to the second MAC operator 121, with the lowest bits first. When calculating M of equation (6), however, the G-register 123 will be loaded with lower 16 bits of another intermediate variable T for use by the second MAC operator 121.

The E-register 124 stores a lower 16-bit portion of T, the intermediate variable obtained from equation (5), for use by the second MAC operator 121. The E-register 124 is set to zero when calculating equation (6), since the lowest 64 bits, $\{t3, t2, t1, t0\}$, of the intermediate variable T go to the G-register 123 at that time.

The H-register 125 stores upper 64 bits out of 80 bits that the second MAC operator 121 produces. This H-register 125 is actually a 68-bit wide register, the additional four-bit portion storing carry bits that are produced by and sent back to the second MAC operator 121 as will be described later.

With the above-described configuration of registers, the second MAC operator 121 takes in a value of intermediate variable T at the rate of 16 bits per clock cycle in processing equation (6). While the resulting MAC output has a width of 80 bits, the upper 64 bits of that are used as a MAC input in the next clock cycle, meaning that only the remaining 16 bits are regarded as the true outcome. Accordingly, the total amount of data consumed and produced in each single clock cycle is 32 bits, concerning equation (6).

When calculating (7), the second MAC operator 121 takes in the input value N, together with the intermediate variable T, each at the rate of 16 bits per clock cycle, while producing 16 bits of output data in each clock cycle. Those data consumption and production add up to 48 bits. As can be seen from the above calculation, the required data rate is below the maximum data transfer capability (64 bits per clock cycle) that we assume for a single-port memory.

The subtraction unit 130 is composed of a 16-bit subtractor 131 and its associated registers including: J-register (J-REG) 132, I-register (I-REG) 133, K-register (K-REG) 134, and carry registers 135 and 136. The 16-bit subtractor 131 takes charge of equation (8) to yield the final result of computation. The J-register 132 stores a 64-bit portion of the multiple-word input value N read out of the memory. This J-register 132 shifts itself to the right by 16 bits at each clock cycle, thereby supplying N to the 16-bit subtractor 131, with the lowest bits first.

The I-register 133 receives the 16-bit output of the second MAC module 120, which is either the intermediate variable M obtained by equation (6) or the value of M×N+T on the right side of equation (7). The intermediate variable M is supplied to the F-register 122, when it has accumulated up to 64 bits, for the second MAC module 120 to calculate equation (6). The value of M×N+T is meant to be written into the memory after being divided by $2^{64}$. The division is achieved by skipping the first four clock cycles of memory write, i.e., throwing away the lowest 64 bits of M×N+T. Further details will be discussed later.

The K-register 134 accumulates Y of equation (8), which comes out 16 bits at a time from the 16-bit subtractor 131 until the data amounts to 64 bits and is ready for transfer to the memory.

Structure of MAC Operator

Before going into details of operation of the Montgomery modular MAC circuit 100 of FIG. 2, we will describe how the MAC operators 111 and 121 are constructed and how the memory is managed, as well as presenting an example of a control command register.

Figure 3:
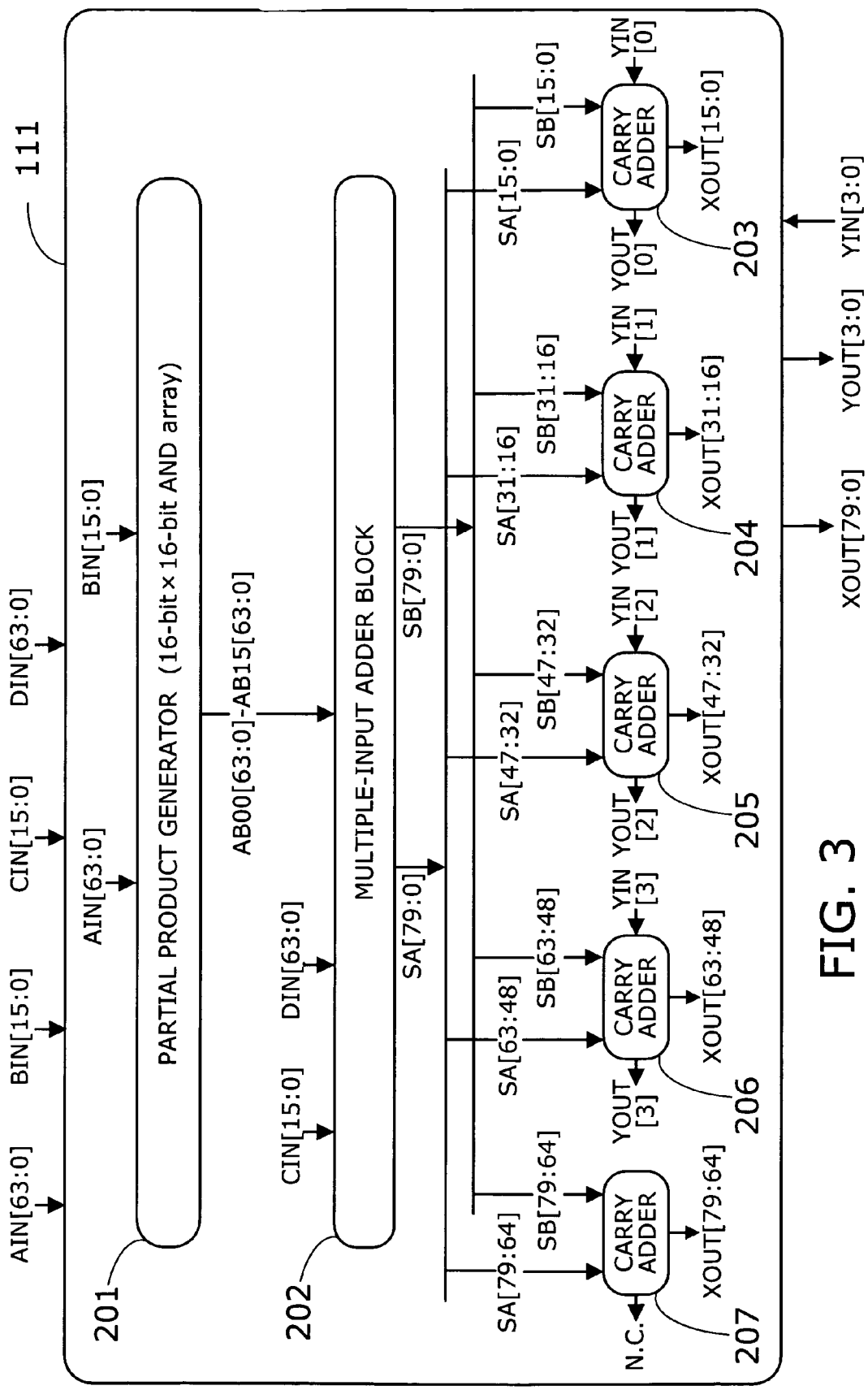
FIG. 3 shows the structure of a MAC operator used in the present embodiment of the invention.

FIG. 3 shows the structure of a MAC operator used in the present embodiment of the invention. As seen from this diagram, the first MAC operator 111 is designed to perform calculation of (64 bits×16 bits+16 bits+64 bits), thus outputting 80 bits. AIN[63:0] denotes 64-bit data of input value A, which is supplied from the A-register 112 explained in FIG. 2. BIN[15:0] denotes 16-bit data of input value B, which is supplied from the B-register 113. Likewise, CIN[15:0] represents 16-bit data of input value C, which is supplied from the C-register 114. DIN[63:0] denotes 64-bit data supplied from the D-register 115, which holds the top 64 bits out of the 80-bit wide MAC output. XOUT[79:0] denotes 80-bit output data of the first MAC operator 111. YOUT[3:0] and YIN[3:0] represent 3-bit carry output and input of the first MAC operator 111, the former being sent to the D-register 115, and the latter being received from the same.

The first MAC operator 111 is composed of a partial product generator 201, a multiple-input adder block 202, and a plurality of 16-bit carry adders 203 to 207. The partial product generator 201 calculates partial products of AIN and BIN, which are referred to as AB00[63:0] to AB15[63:0]. While details are not shown, this partial product generator 201 is constructed as an AND array containing four sets of 16×16 partial product circuits in a parallel arrangement. The multiple-input adder block 202 adds up those partial products AB00[63:0] to AB15[63:0], CIN, and DIN. Five 16-bit carry adders 203 to 207 share the task of resolving carry bits. They are only required to settle their own output of 16 bits in each clock cycle.

The carry adders 203 to 207 accept four carry inputs YIN [3:0] and produce four carry outputs YOUT[3:0], one for each 16-bit portion of output data. The carry outputs YOUT[3:0] are set to the D-register 115 for use as carry inputs YIN[3:0] in the subsequent cycle of MAC operation. This structure of carry adders minimizes the delay of carry signal propagation, and it thus reduces the delay time of a final outcome of the circuit, which makes it possible to raise the operating clock frequency.

When AIN and BIN of the first MAC operator 111 have different bit widths, the bit width of carry adders can be determined such that it will agree with either AIN or BIN, whichever is smaller.

Speaking more of the bit width arrangement, conventional MAC operators have the structure of (W)×(W)+(W)+(W), where W represents the length of a word, and their carry adders have a width of W, accordingly. The first MAC operator 111 in the present embodiment, on the other hand, has the structure of 64×16+16+64, or (2W)×(W/2)+(W/2)+(2W), where the word width W is 32 bits, and therefore, its integral carry adders 203 to 207 have a width of W/2, or 16 bits. While the conventional MAC operators produce the same amount of output as the proposed first MAC operator 111 does, the latter can operate faster because of its smaller output delay time. It has to be noted that MAC operators with a divided carry processing architecture, as those of the present embodiment, will need some extra time to process the pending carries at the end of computation. However, this disadvantage of the divided architecture can be well compensated by its advantage in higher operating clock frequency and consequent reduction of computation time, particularly in such multiple-word MAC applications where the data to be processed is considerably longer than the arithmetic operator's word length. While we have discussed the first MAC operator 111 in the first MAC module 110, the same point applies the second MAC operator 121 in the second MAC module 120 as well.

Memory Data Management

We will now describe below how the memory is managed in the present embodiment of the invention. The Montgomery modular MAC circuit 100 of the present embodiment is designed to operate with a single unified memory system, which stores different kinds of data for computation. Each piece of stored data can be identified by its top address and data length. It should be possible to allocate appropriate memory areas to all input values A, B, C, and N, as well as to output values X and Y, before computation starts.

While it is not explicitly shown in the accompanying drawings, the Montgomery modular MAC circuit 100 is under the control of a central processing unit (CPU) or other device that specifies input data and computation result, which will be referred to hereafter as an "external controller." This external controller has to select either X or Y as its final output of the computation, depending on the result of subtraction performed in equation (8). The step of selecting which to output would add complexity to memory management tasks of the external controller.

Figure 4:
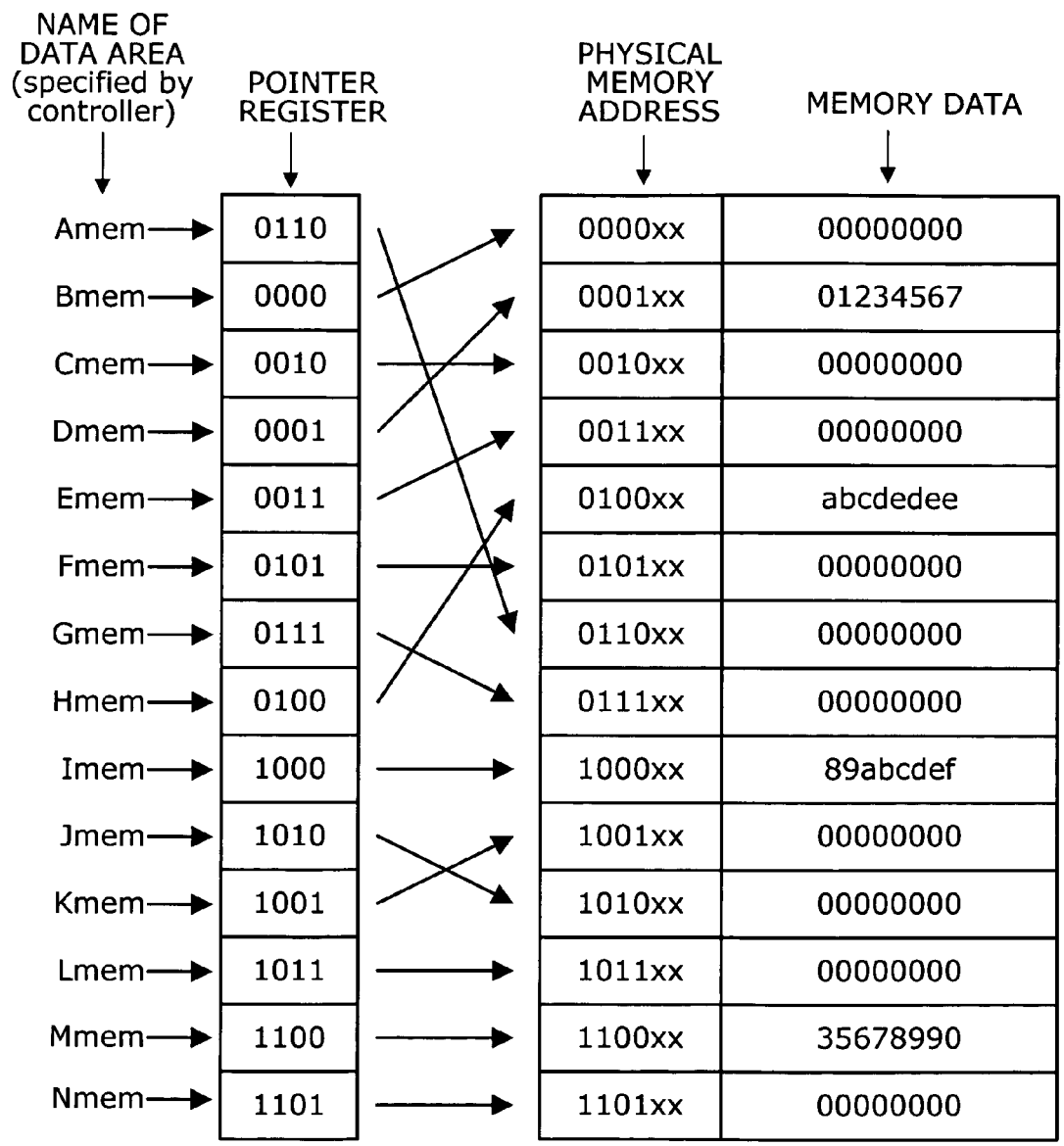
FIG. 4 shows memory management according to the present embodiment of the invention.

FIG. 4 shows memory management according to the present embodiment of the invention. The Montgomery modular MAC circuit 100 provides a plurality of pointer registers as part of its memory management mechanism, aside from the external controller mentioned above. Those pointer registers hold the top address of each memory area without duplication. In the example FIG. 4, "Amem," "Bmem," . . . "Nmem" are the names used by the external controller to specify data areas on the memory, which are uniquely associated with the individual pointer registers. That is, one pointer register permits the external controller to designate a single particular data area. When the external controller specifies, for example, "Amem," it refers to the data area beginning at physical memory address of "011000," which is pointed by the pointer register associated with the name "Amem."

Figure 5:
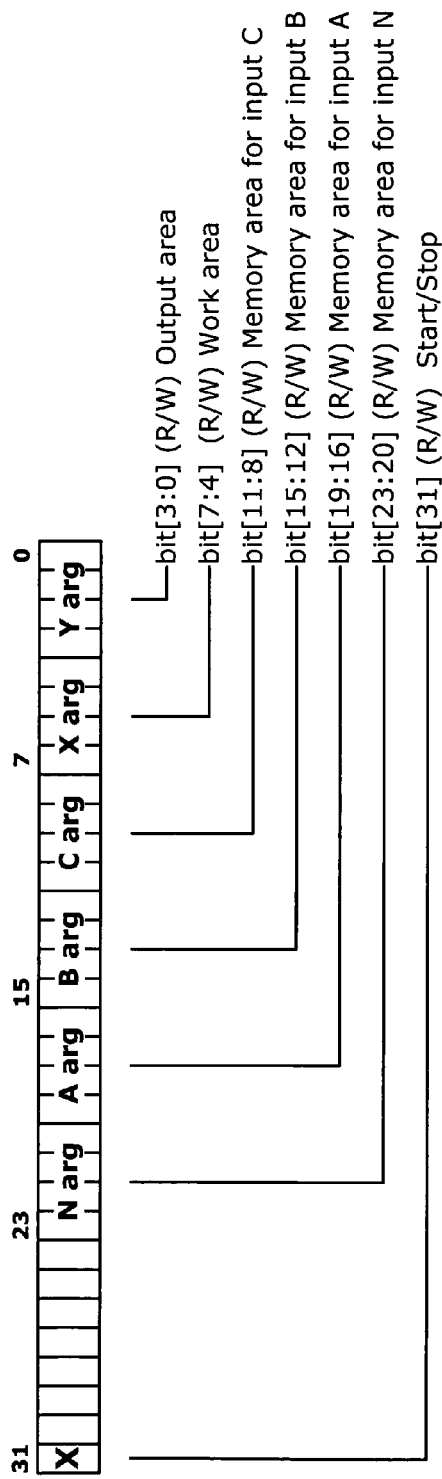
FIG. 5 shows an example of a control command register.

FIG. 5 shows an example of a control command register. The illustrated control command register can be read and written by the external controller. As explained in FIG. 4, data areas defined in the memory are referred to by their names "Amem" to "Nmem," to each of which a unique four-bit code is assigned. To allocate an area on the memory space to each input value, the control command register of FIG. 5 has six four-bit fields named "N arg," "A arg," and so on, where "arg" is short for "argument." Those argument fields are to be filled with four-bit codes representing particular data areas.

The control command register of FIG. 5 is 32 bits in length, in which bit[3:0] (the lowest four bits) specifies the data read/write (R/W) area for an output value Y, and bit[7:4] specifies the work area for another output value X, where X and Y would swap their positions if required. The term "work area" refers to a memory area for temporary data, the content of which may be overwritten with other data or made indefinite. Bit[11:8] specifies the data read/write area for an input value C. Likewise, bit[15:12] and bit[19:16] specify the data read/write areas for other input values B and A, respectively. Bit[23:20] specifies the data read/write area for yet another input value N. Lastly, Bit[31] is a control bit to start or stop the computation.

With the above-described memory management mechanism, the Montgomery modular MAC circuit 100 determines which physical memory area to use when reading or writing particular input or output data. This is accomplished by identifying each data area name that the external controller has specified as a data source or destination, and referring to the pointer register associated with that name. The Montgomery modular MAC circuit 100 then starts computation in the way we have described in equations (5) to (8). The resulting output values X and Y are stored in their respective memory areas specified. If the last equation (8) yields Y<0, then the Montgomery modular MAC circuit 100 has to swap X and Y. This task can be done by simply exchanging the content (i.e., top address of allocated data area) of the corresponding pointer registers.

The external controller previously defines work areas and output data areas by specifying their respective data area names. By changing the pointer register values, data entries on the memory can be moved or swapped while keeping the consistency of associations between data area names and their intended data contents. This feature helps the external controller manage memory areas.

A Montgomery modular multiplication-accumulation process may involve operations between a memory value and a constant value, such as "0" or "1," as in the calculation of T=A×1+0. The command register allows a constant "0" or "1" to be specified instead of data area names, thus eliminating the need for writing such constant values into the memory. As FIG. 5 shows, the argument fields of the command register may contain a special code that is assigned not for a memory area, but for a constant value. The Montgomery modular MAC circuit 100 is supplied with constant values in this way.

The above-described memory management mechanism and control algorithm make it easy for the external controller to manage the Montgomery modular MAC circuit 100. While such mechanism and algorithm can be implemented as part of the external controller itself, this option might not be a choice if the external controller is an embedded processor not powerful enough to handle the tasks. In that case, the above-described pointer registers integrated in the Montgomery modular MAC circuit 100 will be a great help for the external controller to manage large amounts of data on the memory, thus enabling the Montgomery modular MAC circuit 100 to deliver its full performance.

Operation of Montgomery Modular MAC Circuit

Figure 6:
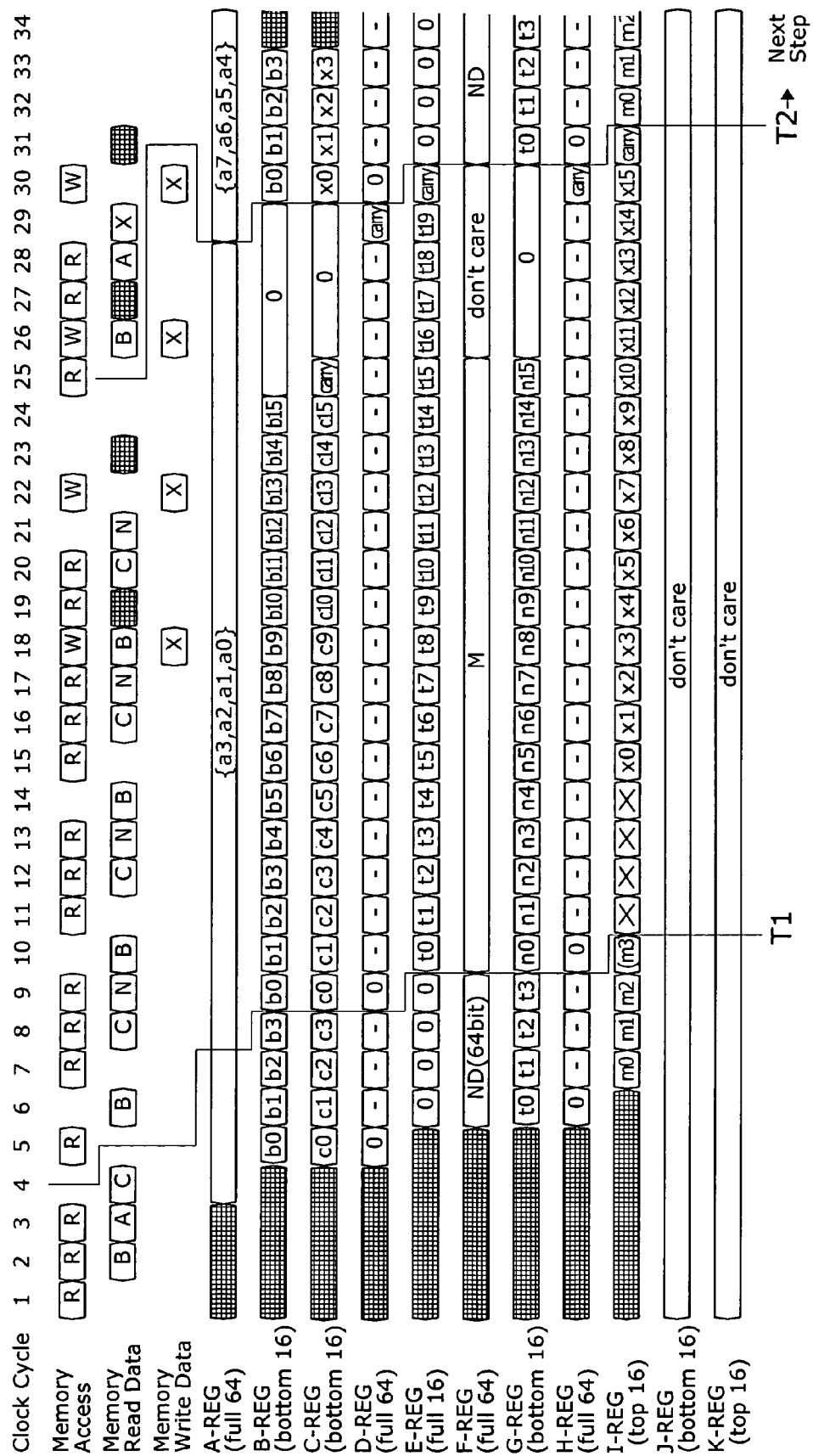
FIGS. 6 and 7 are the first and second halves of a timing diagram showing the operation of the Montgomery modular MAC circuit according to the present embodiment of the invention.
Figure 7:
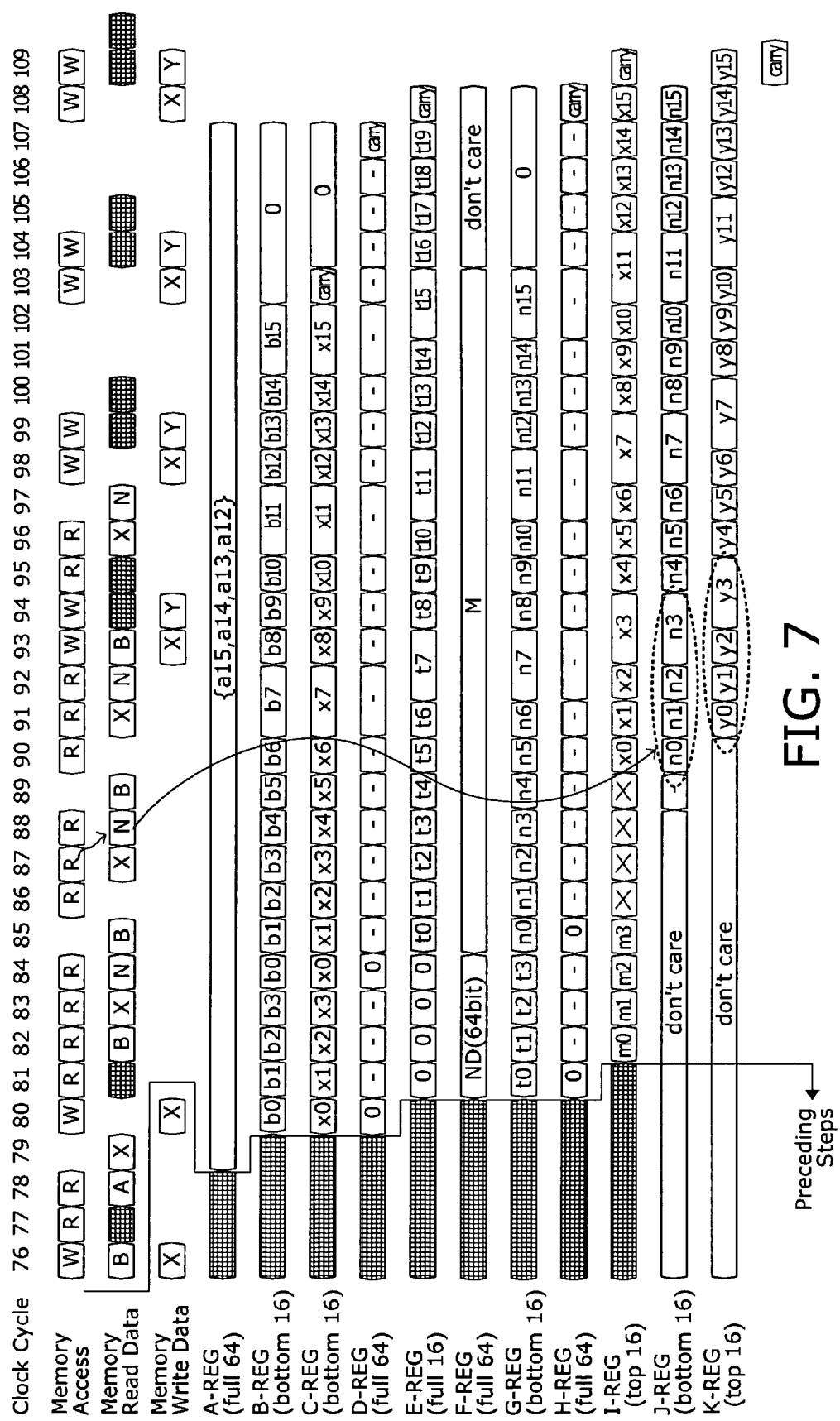

Referring now to the timing diagram of FIGS. 6 and 7, we will describe how the Montgomery modular MAC circuit 100 of FIG. 2 operates in greater detail.

FIGS. 6 and 7 are the first and second halves of a timing diagram showing the operation of the Montgomery modular MAC circuit according to the present embodiment of the invention. Shown on the topmost line of this timing diagram is the sequence number of clock cycles, which is followed by "Memory Access" indicating memory read or write operations from the external controller. The third and fourth lines captioned "Memory Read Data" and "Memory Write Data" show the data read out of and written into the memory, respectively. The subsequent lines represent the value of each register of the Montgomery modular MAC circuit 100 described in FIG. 2. They are: full 64 bits of A-register 112, lower 16 bits of B-register 113, lower 16 bits of C-register 114, full 64 bits of D-register 115, full 16 bits of E-register 124, full 64 bits of F-register 122, lower 16 bits of G-register 123, full 64 bits of H-register 125, upper 16 bits of I-register 133, lower 16 bits of J-register 132, and upper 16 bits of K-register 134.

The notation used in this timing diagram is as follows: The dash sign "-" represents an intermediate result of computation. The hatching means "indefinite." The cross mark "x" shown in the line of I-register 133 indicates an output value that needs no processing. The remark "don't care" means that the value may be "0" or "1."

The process begins with a step for A{a3, a2, a1, a0}, the lowest 64 bits of a given input value A. The time up to T1 is used to calculate an intermediate variable M of equation (6). Memory read access from the external controller (not shown) takes place at clock cycles #1 to #3, which reads 64-bit portions of three input values B, A, and C out of the memory in that order and sets those values to corresponding registers. Specifically, A{a3, a2, a1, a0} is set to the A-register 112, B{b3, b2, b1, b0} is set to the B-register 113, and C{c3, c2, c1, c0} is set to the C-register 114. Those values are subjected to the first MAC operator 111 for computation.

The first MAC operation that follows the above is {a3, a2, a1, a0}×b0+c0, for, as explained earlier, the first MAC operator 111 of the present embodiment is designed to process 16 bits at a time as to the input values B and C while using full 64 bits for the other input value A. This MAC operation yields the lowest 16 bits of intermediate variable T, or t0, which is sent to the G-register 123. The value of t0 in the G-register 123 is supplied to the second MAC operator 121, together with yet another 64-bit input value ND in the F-register 122, for calculation of equation (6). The bottom 16 bits of the result, which is actually the lowest 16 bits of intermediate variable M, go to the topmost 16 bits of the I-register 133. The first MAC operator 111 repeats the above processing for the remaining bits b1 to b3 and c1 to c3, thus allowing the I-register 133 to receive more 16-bit results m1, m2, and m3 by shifting itself. In this way, M{m3, m2, m1, m0} is obtained in the I-register 133.

Calculation of an output value X begins at time T1. A memory read cycle occurs at clock cycle #5 to fetch the lowest 64-bit portion of input value B, B{b3, b2, b1, b0}, and at the clock cycle after next, another read cycle takes place to read the lowest 64-bit portion of C, or C{b3, b2, b1, b0}. Since the B-register 113 has an extra buffer with a length of 32 bits, as mentioned earlier, the bottom 16-bits of the B-register 113 and C-register 114 are supplied simultaneously to the first MAC operator 111. Since the A-register 112 has already been loaded with the lowest 64 bits of A, the first MAC operator 111 readily executes equation (5) and thus produces an intermediate variable T, 16 bits at a time. The resulting t0, t1, t2, and t3 are transferred to the E-register 124 in that order, for use in the second MAC operator 121. Also supplied to the second MAC operator 121 are: 64-bit intermediate variable M in the F-register 122 and 64-bit input value N in the G-register 123. N has been read out of the memory at clock cycle #8, and its four 16-bit segments (n0, n1, n2, n3) are sent to the second MAC operator 121 one by one. The second MAC operator 121 calculates equation (7) and sets the result X to the top 16 bits of the I-register 133. The resulting 64-bit value in the I-register 133, however, will not be written into the memory because, as we described earlier, the equation (7) involves division by $2^{64}$. FIG. 6 shows this abandoned data with a cross mark ("x").

At clock cycle #9, yet another memory cycle occurs to read B{b7, b6, b5, b4}, the second part of input value B. This is followed by similar read cycles for other input values C and N, thus allowing the two MAC operators 111 and 121 to calculate equations (5) and (7), respectively. The resultant output value X is sent to the I-register 133, 16 bits at a time. When X{x3, x2, x1, x0} is ready in the I-register 133, a memory write cycle occurs at clock cycle #18, thus saving the 64-bit output value of X into the memory.

The remaining output values X{x7, x6, x5, x4}, X{x11, x10, x9, x8}, and X{x15, x14, x13, x12} are calculated in almost the same way. The exception is when calculating X{x15, x14, x13, x12}, the last four segments of output value X. During this calculation, the input values of B and C in equation (5) are forced to be zeros, M is "don't care," and N is set to zero in equation (7).

This concludes the first step with A{a3, a2, a1, a0}, namely, the first 64-bit segment of input value A. The next step begins at T2, with the second segment of A, or A{a7, a6, a5, a4}. Unlike the first step, however, this new step and subsequent steps use the previous output value X in the memory in place of C.

The third segment A{a11, a10, a9, a8} and fourth segment A{a15, a14, a13, a12} are then processed in the way shown in FIG. 7. In the final step, the 16-bit subtractor 131 plays its role in execution of equation (8) to produce an output value of Y. As the second MAC operator 121 produces a new 16-bit value of the other output X, the 16-bit subtractor 131 receives each part of input value N{n3, n2, n1, n0} from the J-register 132. This value of N has already been loaded in the J-register 132 since the memory read access at clock cycle #87. The subtraction results are transferred to the K-register 134, 16 bits at a time, before they make a 64-bit output value of Y{y3, y2, y1, y0} and are written together into the memory at clock cycle #94. In order to allocate time to such memory write cycles, however, it is necessary to stop temporarily the multiplication-accumulation pipeline. The remaining output values Y{y7, y6, y5, y4}, Y{y11, y10, y9, y8}, and Y{y15, y14, y13, y12} are calculated and saved in the memory in the same way as above.

As can be seen from the above explanation, the proposed Montgomery modular MAC circuit 100 produces three 64-bit memory reads and one 64-bit memory write within a four-clock period. This memory bandwidth requirement is small enough for the circuit 100 to operate efficiently with a single-port memory with a data width of 64 bits, so that its internal MAC operators 111 and 121 can run at the full clock speed.

While we have described an example implementation with two MAC operators, the present invention should not be limited to that specific type. As an alternative approach, a time-sharing technique may be introduced to execute equations (5) to (7) by using a single MAC operator, without causing too much adverse effect on the efficiency of MAC operator usage.

As a yet another alternative approach, equations (5) to (7) may be processed concurrently by three cascaded MAC operators. Despite of its lower MAC operator usage in the calculation of M=T×ND, this architecture enables faster computation since it provides more regulated data flow on the pipeline as a whole.

Further, considering the fact that each input value A, B, and N is not a single word, but consists of a plurality of data words, it is also possible to process multiple data words of such input values concurrently by using four or more MAC operators connected in series. This is another approach to faster computation.

Single MAC Operator Structure

Figure 8:
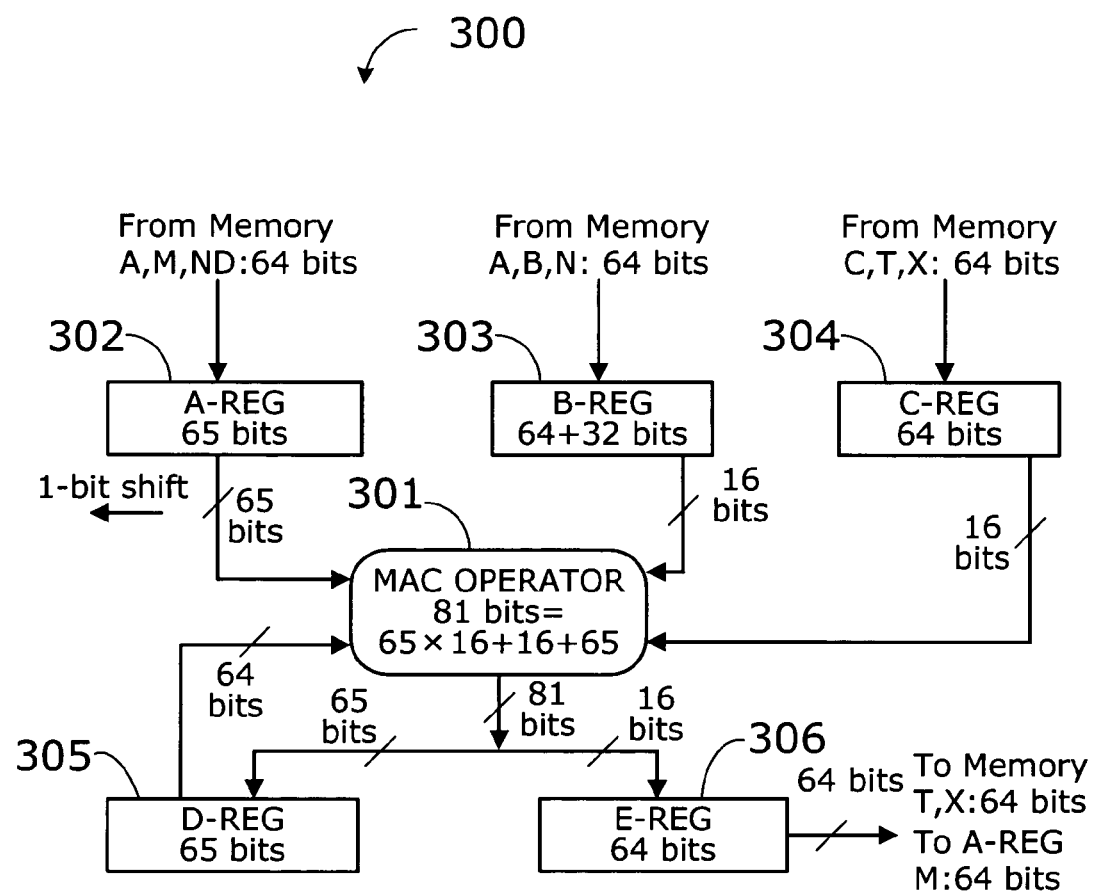
FIG. 8 is a block diagram of a Montgomery modular MAC circuit with a single MAC operator.

FIG. 8 is a block diagram of a Montgomery modular MAC circuit with a single MAC operator. While the circuit actually needs a subtractor for equation (8), this block diagram omits it since we have already discussed the structure and functions of such circuit in FIG. 2. Also omitted from the illustration for the same reason is a 64-bit wide single-port memory for storing input and output values.

The illustrated Montgomery modular MAC circuit 300 is composed of a MAC operator 301 and its associated registers, including: A-register (A-REG) 302, B-register (B-REG) 303, C-register (C-REG) 304, D-register (D-REG) 305, and E-register (E-REG) 306. The first three registers 302 to 304 are used to supply the MAC operator 301 with input values such as: 64-bit input values A, B, C, N, and ND; intermediate variables M and T; and output value X.

The A-register 302 is a 65-bit register that provides the MAC operator 301 with a 64-bit value of A or ND or M read out of the memory, together with one extra bit that is expanded from the 64-bit part. The B-register 303 stores a 64-bit value of A, B, or N read out of the memory and supplies it to the MAC operator 301, 16 bits at a time. The B-register 303 has extra 32 bits and is thus 96 bits in total length. Similar to this, the C-register 304 stores a 64-bit value of C, T, or X read out of the memory and supplies it to the MAC operator 301, 16 bits at a time.

The D-register 305 and E-register 306 receive the output of the MAC operator 301. The D-register 305 holds the upper 65 bits for use as an input of the MAC operator 301 in the next cycle, while the E-register 306 receives the lowest 16 bits each time a MAC operation is done. When filled up to its capacity of 64 bits, the E-register 306 sends out the data to the memory as an intermediate variable T or output value X, or to the A-register 302 as an intermediate variable M.

The Montgomery modular MAC circuit 300 of FIG. 8 processes all equations (5) to (7) by time-sharing a single MAC operator 301. This MAC operator 301 is configured to perform MAC operation of 65×16+16+65 (in bits) and yield an 81-bit output due to the reason described below.

In the case that a binary method is used for exponentiation, as an application of Montgomery modular multiplication-accumulation, the process is likely to involve squaring operations (T=A×A), and it is thus desirable to accelerate this type of computation. Thinking of its double-loop process, the number of iterations can be almost halved by: skipping if i>j; calculating T=T+A[i]×A[j] if i=j; and T=T+2×A[i]×A[j] if i<j. The term 2×A[i]×A[j] can be achieved by shifting the result of A[i]×A[j] to the left by one bit. Implementing this function in the MAC operator 301 would increase the complexity of circuit structure, resulting in a longer critical path.

According to the structure of FIG. 8, the shifting function is realized by adding an extra bit to the A-register 302, so that, if i<j, the expanded A-register 302 will shift itself to the left to multiply the given input value A[i] by two. This approach of the present invention successfully accelerates the computation while keeping the MAC operator 301 as simple as possible.

Triple MAC Operator Structure

While we have assumed the use of a single-port memory in describing the present invention, the memory for storing input values and output values may be a multi-port memory. As already explained, carry processing at the final stage can be implemented as a plurality of adders for faster computation. In addition, the present invention offers greater variety in the design of MAC operators because of its non-uniform input data widths for multiplier and multiplicand. This includes integration of many MAC operators to increase the computational speed as will be described in FIG. 9. Those pipeline processing techniques may be combined with the advantage of multi-port memory architecture, which will make further acceleration possible.

Figure 9:
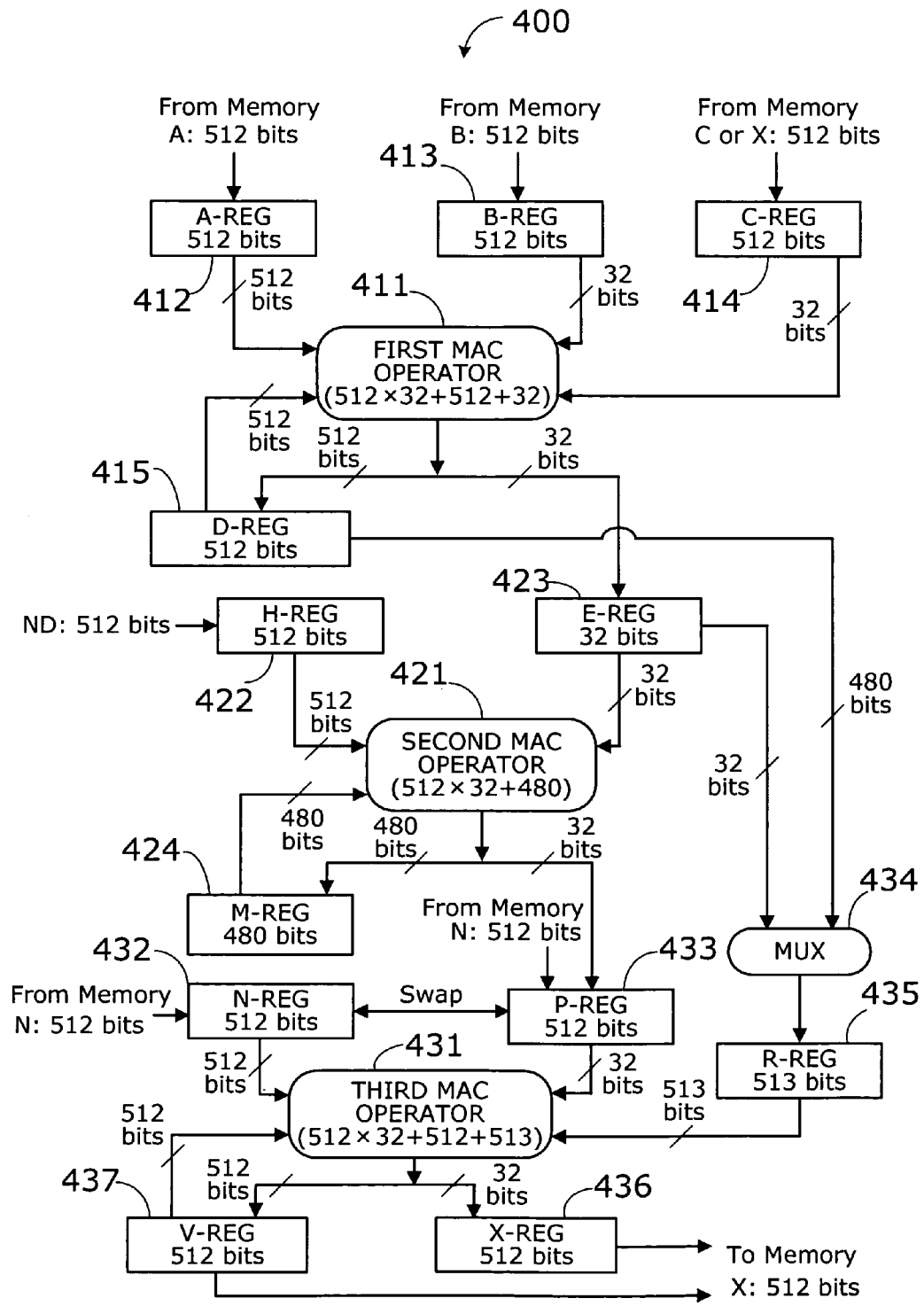
FIG. 9 is a block diagram of a Montgomery modular MAC circuit with three MAC operators.

FIG. 9 is a block diagram of a Montgomery modular MAC circuit with three MAC operators. This circuit employs one dedicated MAC operator for each of the three equation (5) to (7). While the circuit actually needs a subtractor for equation (8), the block diagram omits it since we have already discussed the structure and functions of such circuit in FIG. 2. Also omitted from the illustration is a memory for input and output values, for which we assume the use of a three-port memory with a data width of 512 bits.

The illustrated Montgomery modular MAC circuit 400 is composed of three MAC operators 411, 421, and 431 and many registers coupled to them. The first MAC operator 411 calculates equation (5), receiving an input value A from the A-register (A-REG) 412, B from the B-register (B-REG) 413, and C or X from the C-register (C-REG) 414, where X is the end result of computation. The top 512 bits of MAC output is set to the D-register (D-REG) 415 for use as a next input to the first MAC operator 411.

The second MAC operator 421 calculates equation (6), receiving a 512-bit input value ND from the H-register (H-REG) 422, an intermediate variable T from the E-register (E-REG) 423, where T is the lowest 32-bit output of the first MAC operator 411. The M-register (M-REG) 424 latches the top 480 bits of the MAC output and feeds them back to the second MAC operator 421 for use as a next input.

The third MAC operator 431 calculates equation (7), in cooperation with surrounding registers including N-register (N-REG) 432, P-register (P-REG) 433, R-register (R-REG) 435, X-register (X-REG) 436, and V-register (V-REG) 437, and a multiplexer (MUX) 434 coupled to the R-register 435. The N-register 432 holds 512 bits of an input value N. The P-register 433 holds either 512 bits of the input value N or receives the lowest 32 bits of the second MAC operator's output (i.e., intermediate variable M). This P-register 433 supplies the third MAC operator 431 with its stored data, 16 bits at a time. The multiplexer 434 selects either the bottom 32 bits of the first MAC operator's output (i.e., intermediate variable T) or the top 480 bits of the same. The selected value is set to the R-register 435 for use as an input to the third MAC operator 431. The output of the third MAC operator 431 goes to two registers: lower 32 bits to the X-register 436 and upper 512 bits to the V-register 437. The X-register 436 takes in each produced 32-bit data and sends them to the memory as an output value X when filled up to its capacity of 512 bits. The 512-bit data of the V-register 437 is fed back to the third MAC operator 431 or written into the memory.

Figure 10:
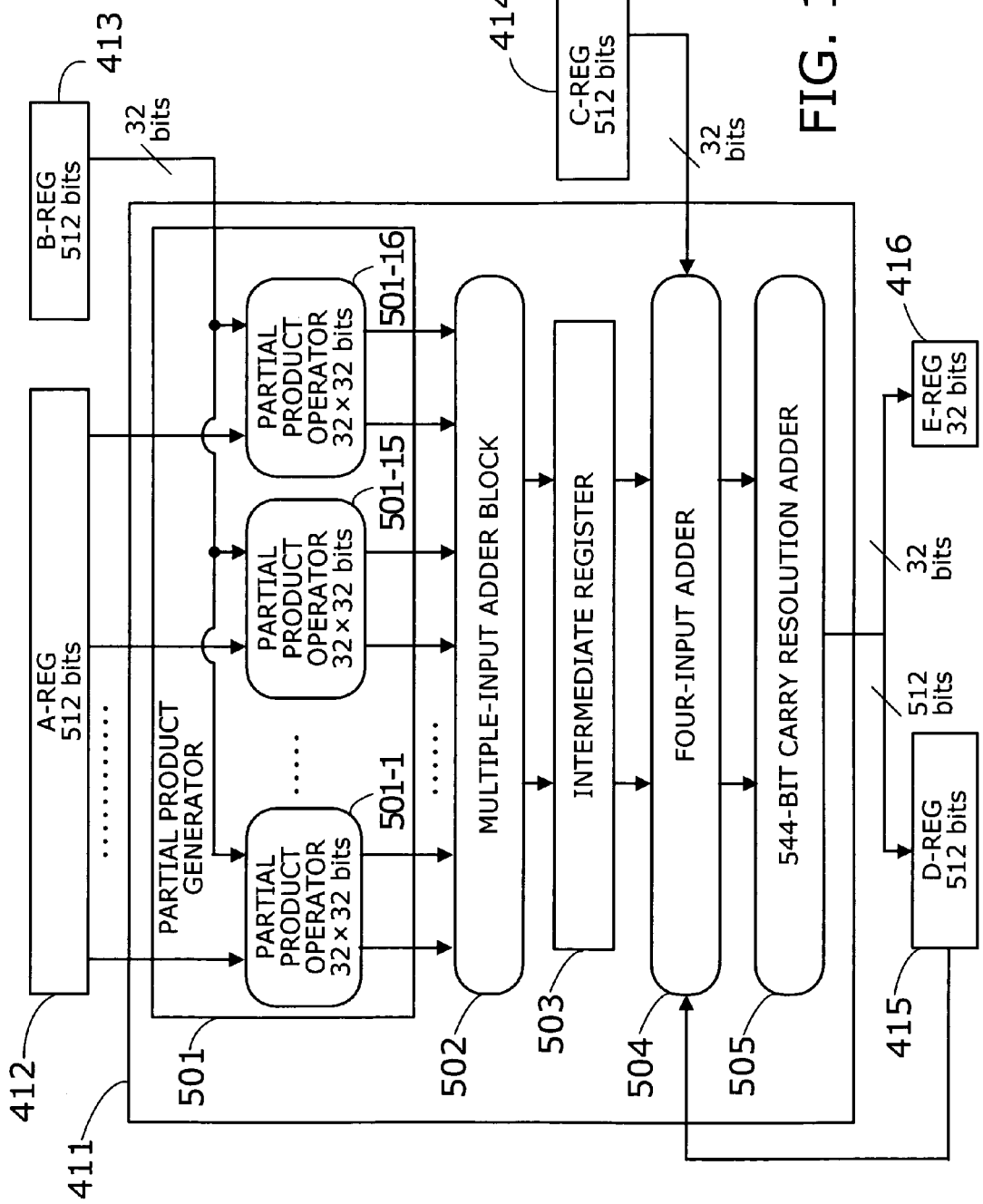
FIG. 10 shows the structure of a MAC operator whose multiple-input adder is split into two stages by an intermediate register.
Figure 11:
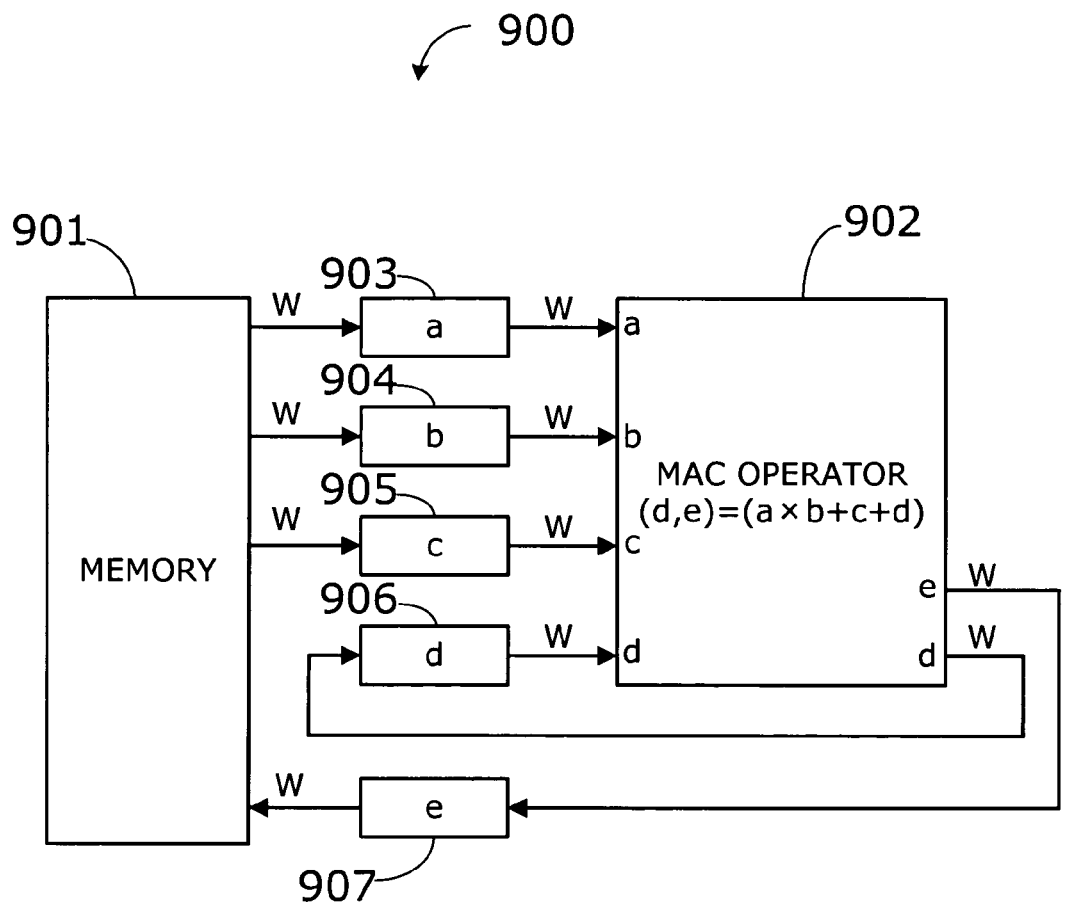
FIG. 11 is a block diagram of a conventional multiple-word MAC circuit.

FIG. 10 shows the structure of a MAC operator whose multiple-input adder is split into two blocks by inserting an intermediate register. The illustrated MAC operator 411 is composed of a partial product generator 501, a multiple-input adder block 502, an intermediate register 503, a four-input adder 504, and a 544-bit carry resolution adder 505. The partial product generator 501 is a parallel array of sixteen partial product operators 501-1, 501-2, ..., 501-16, each performing multiplication of 32 bit values.

The partial product generator 501 receives 512 bits from the A-register 412, which are distributed to sixteen partial product operators 501-1, 501-2, ..., 501-16, 32 bits for each. The B-register 413, on the other hand, supplies its bottom 32 bits to all the partial product operators 501-1, 501-2, ..., 501-16, while shifting itself rightward 32 bits at a time. The resulting partial products are added up at the multiple-input adder block 502 and sent to the four-input adder 504 through the intermediate register 503. The four-input adder 504 further receives 512-bit data from the D-register 415 and 32-bit data from the C-register 414, which are added to the value of A×B. Finally, the 544-bit carry resolution adder 505 processes carry output of the four-input adder 504, thus sending the top 512 bits of the result to the D-register 415 and remaining 32 bits to the E-register 416.

The above structure employs the intermediate register 503 to split the first MAC operator 411 into two stages at the point between the multiple-input adder block 502 and four-input adder 504, thereby enabling the two stages to operate in a pipelined fashion. The processing speed of the first MAC operator 411 will be maximized if the first stage (multiple-input adder block 502) and second stage (544-bit carry resolution adder 505) are equalized in terms of their delay times. The first stage's delay time is a function of the size of the multiplier, namely, the number of terms to be added. The second-half delay time, on the other hand, is a function of the output bit width of the first MAC operator 411.

Think of a MAC operator whose multiplicand and multiplier input ports have the same bit width. We would not be able to enhance the speed of this type of MAC operator by inserting an intermediate register 503 in the same way as described above, since the preceding multiple-input addition stage would have a far greater delay time than the succeeding carry resolution stage. The first MAC operator 411 of the present invention, on the other hand, has multiplicand and multiplier input ports with different bit widths. This means it is possible to select appropriate bit widths so that the two stages will have balanced delay times. The proposed MAC operator 411 can therefore enjoy the total performance advantage of pipelined structure.

The above-described features of the first MAC operator 411 apply to the second MAC operator 421 as well because of their similarity in structure. The third MAC operator 431 is almost similar to the others except it has 513-bit adder functions. We therefore omit explanation for them.

The following gives an overview of how the circuit of FIG. 9 executes Montgomery modular multiplication-accumulation, assuming first that each input value is no greater than 512 bits.

From given input values A, B, and C, as well as from the bottom 32 bits of output value X, the first MAC operator 411 calculates an intermediate variable T and outputs its bottom 32 bits. The second MAC operator 421 calculates another intermediate variable M and outputs its bottom 32 bits, based on another given input value ND and the bottom 32 bits of the intermediate variable T obtained at the preceding stage. The third MAC operator 431 receives yet another given input value N, the bottom 32 bits of the intermediate variable M supplied from the second MAC operator 421, and the bottom 32 bits of the intermediate variable T supplied from the first MAC operator 411. From those inputs, the third MAC operator 431 calculates an output value X and sends its bottom 32 bits. The three MAC operators 411, 421, and 431 repeats their respective tasks sixteen times. At the end of those iterations, the circuit 400 of FIG. 9 will have made available the top 512 bits of intermediate variable T in the D-register 415, top 512 bits of output value X in the V-register 437, and bottom 512 bits of the output value in the X-register 436. This is followed by a finishing cycle of the third MAC operator 431, in which it adds up the upper bits of the intermediate variable T, which is selected by the multiplexer 434, and upper bits of the output value X. The result is set to the V-register 437, and the upper bits of X in this V-register 437 are written into the memory as the final outcome of the computation.

When the data size is greater than 512 bits, the Montgomery modular MAC circuit 400 of FIG. 9 operates as follows: First, with the least significant 512 bits of a given input value A, the Montgomery modular MAC circuit 400 repeats the above-described procedure sixteen times, while saving all produced intermediate variables M into the P-register 433. The circuit 400 then transfers the resulting 512-bit intermediate variable M to the N-register 432 and loads the P-register 433 with an input value N read out of the memory, which is equivalent to swapping the contents of the N-register 432 and P-register 433. The third MAC operator 431 continues to calculate the output value X, 32 bits at a time, receiving 512 bits of M, bottom 32 bits of N, and bottom 32 bits of T. By repeating the above process for the entire length of the given input value A, the circuit 400 achieves Montgomery modular multiplication-accumulation of large input values over 512 bits.

CONCLUSION

To summarize the above explanation, the proposed multiple-word MAC circuit has at least one MAC operator having multiplicand and multiplier input ports with different bit widths. The MAC operator is surrounded by a plurality of registers storing data read out of a memory. Since the amount of data to be supplied to the MAC operator in each clock cycle is adjusted such that the total amount of data consumed and produced by the MAC operator in one clock cycle will be equal to or smaller than the maximum amount of data that the memory can transfer in one clock cycle. The MAC operator can operate with a bandwidth-limited single-port memory without sacrificing efficiency in its use. Single-port memories are less complex than multi-port memories, meaning that the proposed MAC circuit can be implemented without consuming too much chip space.

The proposed MAC circuit can be used to encrypt or decrypt data with an RSA public-key cryptosystem, which involves modular arithmetic operations. The present invention is thus applicable to, but not limited to, ID cards or like devices containing such a cryptographic chip.

The present invention has been described with an assumption that radix R is a power of 2, and that N is an odd integer. However, we do not intended to limit the present invention to that condition. The present invention works well when the radix R is larger than and coprime to the integer N.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multiple-word multiplication-accumulation (MAC) circuit that performs MAC operation on given input values each supplied as multiple-word data, comprising:
   a memory bus having a first bit width, directly coupled to a single-port memory configured to provide storage for a plurality of multiple-word data;
   a MAC operator having multiplicand and multiplier input ports with different bit widths to calculate a sum of products of the multiple-word data read out of said single-port memory;
   a first register configured to input a multiplicand with a second bit width to said MAC operator;
   a second register configured to input a multiplier with a third bit width to said MAC operator in each clock cycle;
   a third register configured to input a first additional value with the third bit width to said MAC operator in each clock cycle;
   a fourth register configured to hold an upper portion with the second bit width of said MAC operator's output, and input a second additional value with the second bit width to said MAC operator; and
   a fifth register configured to receive a lower portion with the third bit width of said MAC operator's output a plurality of times and to output input values of the fifth register to the single-port memory when an amount of the input values of the fifth register reaches the first bit width,
   wherein total amount of data of the multiplier, the first additional value, and an input value of the fifth register is equal to or smaller than the first bit width.

2. The multiple-word MAC circuit according to claim 1, wherein said MAC operator comprises a plurality of carry adders.

3. A Montgomery modular multiplication-accumulation circuit that performs Montgomery modular multiplication-accumulation of multiple-word data read out of a single-port memory, the circuit comprising at least one multiplication-accumulation (MAC) module which comprises:
   a memory bus, directly coupled to the single-port memory, which has a first bit width;
   a MAC operator having multiplicand and multiplier input ports with different bit widths to calculate a sum of products of multiple-word data read out of the single-port memory; and
   a first register configured to input a multiplicand with a second bit width to said MAC operator;
   a second register configured to input a multiplier with a third bit width to said MAC operator in each clock cycle;
   a third register configured to input a lower portion with the third bit width of an output of a MAC operator of a MAC module of a preceding stage, and input a first additional value with the third bit width to said MAC operator in each clock cycle;
   a fourth register configured to hold an upper portion with the second bit width of said MAC operator's output, and input an additional value with the second bit width to said MAC operator;
   wherein total amount of data of the multiplier, the first additional value, and an input value of the third register is equal to or smaller than the first bit width.

4. The Montgomery modular MAC circuit according to claim 3, further comprising another MAC module connected in series with said at least one MAC module.

5. The Montgomery modular MAC circuit according to claim 3, wherein said MAC operator comprises a plurality of carry adders.

6. The Montgomery modular MAC circuit according to claim 3, further comprising pointer registers to store top address of each piece of the multiple-word data on the single-port memory, wherein:
   said pointer registers are associated with data area names by which an external controller specifies data sources and destinations in the single-port memory, and
   two data sources or two destinations are substituted for each other, by not changing the data area names specified by the external controller, and only by swapping the top addresses contained in the pointer registers associated with the specified data area names.

7. The multiple-word MAC circuit according to claim 1, wherein the first bit width is one word.

8. The Montgomery modular MAC circuit according to claim 3, wherein the first bit width is one word.

* * * * *